(12) United States Patent
Shoval

(10) Patent No.: US 9,261,201 B2
(45) Date of Patent: Feb. 16, 2016

(54) AUTOMATIC GAS PURGE VALVE

(75) Inventor: Meir Shoval, D.N. Ramat Hagolan (IL)

(73) Assignee: A.R.I. FLOW CONTROL ACCESSORIES LTD., D.N. Ramat Hagolan (IL)

( * ) Notice: Subject to any disclaimer, the term of this patent is extended or adjusted under 35 U.S.C. 154(b) by 189 days.

(21) Appl. No.: 14/002,448

(22) PCT Filed: Mar. 13, 2012

(86) PCT No.: PCT/IL2012/050084
§ 371 (c)(1),
(2), (4) Date: Aug. 30, 2013

(87) PCT Pub. No.: WO2012/123940
PCT Pub. Date: Sep. 20, 2012

(65) Prior Publication Data
US 2013/0333775 A1    Dec. 19, 2013

Related U.S. Application Data

(60) Provisional application No. 61/452,405, filed on Mar. 14, 2011.

(51) Int. Cl.
*F16K 24/04*    (2006.01)
*F16K 31/22*    (2006.01)
*F16K 31/34*    (2006.01)

(52) U.S. Cl.
CPC .............. *F16K 24/04* (2013.01); *F16K 24/042* (2013.01); *F16K 31/22* (2013.01); *F16K 31/34* (2013.01); *Y10T 137/7762* (2015.04)

(58) Field of Classification Search
CPC ..... F16K 24/04; F16K 24/042; F16K 24/044; F16K 31/34; F16K 31/22
USPC .......... 137/202, 409, 410, 412, 413, 414, 438
See application file for complete search history.

(56) References Cited

U.S. PATENT DOCUMENTS

| | | |
|---|---|---|
| 2,960,104 A | 11/1960 | Hudson |
| 3,054,419 A | 9/1962 | Farrell |
| 4,230,142 A * | 10/1980 | Saarem et al. ................. 137/202 |
| 4,475,932 A | 10/1984 | Hull et al. |
| 4,770,201 A | 9/1988 | Zakai |
| 5,065,782 A | 11/1991 | Szlaga |
| 5,183,087 A | 2/1993 | Aubel et al. |
| 6,105,608 A | 8/2000 | Katzman |

(Continued)

FOREIGN PATENT DOCUMENTS

| | | |
|---|---|---|
| CN | 1717264 A | 1/2006 |
| DE | 1 168 658 B | 4/1964 |

OTHER PUBLICATIONS

The International Search Report for PCT/IL2012/050084, mailed Jul. 23, 2012, three pages.

*Primary Examiner* — William McCalister
*Assistant Examiner* — Ian Paquette
(74) *Attorney, Agent, or Firm* — Vorys, Sater, Seymour & Pease LLP

(57) ABSTRACT

Provided is an automatic gas purge valve system including a normally closed gas discharge faucet configured for discharging gas at substantially high flow rates, and an automatic valve unit configured for selectively generating a flow pulse to displace the gas discharge faucet into its open position.

12 Claims, 7 Drawing Sheets

(56) References Cited

U.S. PATENT DOCUMENTS

| | | |
|---|---|---|
| 7,097,632 B2 | 8/2006 | Shia et al. |
| 7,617,838 B2 | 11/2009 | Katzman et al. |
| 2008/0276994 A1* | 11/2008 | Goetzinger et al. .......... 137/218 |
| 2009/0139581 A1* | 6/2009 | Herlihy ........................ 137/202 |
| 2011/0146817 A1* | 6/2011 | Beetham ...................... 137/544 |
| 2014/0060670 A1* | 3/2014 | Grassl et al. .................. 137/409 |
| 2014/0209175 A1* | 7/2014 | Cardia et al. ...................... 137/2 |
| 2014/0305514 A1* | 10/2014 | Mihara ........................ 137/202 |

* cited by examiner

AUTOMATIC GAS PURGE VALVE

FIELD OF THE DISCLOSED SUBJECT MATTER

The present disclosed subject matter relates to a gas purge valve and more specifically to an automatic gas purge valve configured for discharging gas at substantially high flow rates.

BACKGROUND OF THE DISCLOSED SUBJECT MATTER

A wide variety of gas purge valves are known in the art, deigned for fitting on different fluid systems and configured for different purposes e.g. pressure control, discharge of residual gas within a liquid in the system, etc.

For example, U.S. Pat. No. 4,770,201 discloses a fluid flow valve such as a faucet or air-purge valve comprising a housing having defined therein a fluid through-flow aperture with a valve seating formed in the housing and bounding said aperture. A flexible closure membrane is secured at one end to the housing and is adapted to be biased, under fluid pressure in the housing, against the valve seating so as to seal the aperture. Membrane displacing means are secured to an opposite end of the membrane so that displacement of the displacing means in a first sense progressively detaches successive transverse portions of the membrane from the seating so as to open the aperture while displacement of the displacing means in an opposite sense allows for the membrane to become sealingly biased against the seating.

A gas purge valve is disclosed in U.S. Pat. No. 7,617,838 directed to a gas purge valve comprising a housing formed with an inlet and an outlet formed with a valve seating, and a sealing assembly comprising a sealing member displaceable between an open position and a closed position. The sealing assembly is supported by an external support lever mechanism extending outside the housing, to thereby displace the sealing assembly into sealing engagement with the valve seating at the closed position.

U.S. Pat. No. 6,105,608 is directed to a gas purge valve comprising a valve housing that has a valve inlet and major and minor valve outlets, a valve partition mounted in the housing divides the housing into a first chamber communicating with the valve inlet and a second chamber that communicates with the minor valve outlet. A restrictive flow passage is defined in the housing that effects communication between the first and second chambers and has a through flow rate less than that of the minor valve outlet. A minor valve closure device is provided for closing the minor valve outlet to liquid to outflow. A differential pressure responsive device mounted in the partition member and displaceable in response to a pressure differential between the chambers and a major valve outlet obturating device responsive to displacement of the differential pressure responsive device into the opening of the major valve outlet when the pressure differential exceeds a predetermined magnitude.

SUMMARY OF THE DISCLOSED SUBJECT MATTER

According to the present disclosed subject matter there is disclosed an automatic gas purge valve system comprising a normally closed gas discharge faucet configured for discharging gas at substantially high flow rates, and an automatic valve unit configured for selectively generating a flow pulse to displace the gas discharge faucet into its open position.

The automatic gas purge valve comprises a housing configured with a an automatic valve unit having an inlet port in flow communication with the housing and an outlet port being in flow communication with a control chamber of a normally closed gas discharge faucet, said gas discharge faucet configured with a fluid inlet port being in flow communication with the housing and a fluid discharge port; and wherein the automatic valve is manipulable between a closed position and an open position responsive to liquid level within the housing.

According to one particular configuration the automatic gas purge valve comprises a housing configured with a float member extending into the housing and articulated to an automatic valve unit having an inlet port in flow communication with the housing and an outlet port being in flow communication with a control chamber of a normally closed gas discharge faucet, said gas discharge faucet configured with a fluid inlet port being in flow communication with the housing and a fluid discharge port; and wherein the automatic valve is manipulable between a closed position and an open position responsive to liquid level within the housing. This configuration, when configured with a float member extending into the housing is typically suited for use with dirty liquid, e.g. sewage liquids, industrial waste, etc.

According to another configuration of the disclosed subject matter, the automatic valve unit is connected to the housing of the gas purge valve at a lower portion thereof, wherein manipulation between the closed position and the open position is responsive to liquid level within the housing by communicating vessels rule. This to configuration, when devoid of float member extending into the housing is typically suited for use with liquids substantially free of dirt and matter.

The arrangement is such that liquid rise within the housing displaces the automatic valve into a closed position and liquid decrease results in opening the automatic valve and consequently generating a pressure signal at the control chamber so as to displace the automatic gas purge valve into its open position to purge the valve.

Liquid decrease within the housing corresponds with gas accumulation within the housing.

Any one or more of the following features and designs can be associated with the valve subject of the present disclosed subject matter, in combination or independent from one another:

The housing is configured as a substantially vertically extension in flow communication with the main fluid line;

The length (height) of the housing is at least 4 times the diameter thereof;

A mounting flange accommodates the gas discharge faucet and the automatic valve, said mounting flange is in the form of a top flange of the housing or integral with the housing;

The float is articulated to the automatic valve via a rigid link;

The automatic valve is a peal-away type valve;

The control chamber is configured for airing after displacement of the gas discharge faucet into displace into its open position. Airing can be facilitated via a bleed aperture or a bleed valve. According to one particular example, a bleed aperture is configured at a location between an outlet port of the automatic valve unit and a control chamber of the gas discharge faucet; The housing of the gas purge valve can be configured with a so-called vacuum breaker, configured for facilitating automatic ingress of gas (e.g. ambient air) into the housing at the event of pressure decrease therein. Typically said vacuum breaker is configured as a one-way type valve fitted at an upper portion of the housing;

The housing is configured as a cylindrical chamber for mounting on the main fluid supply line. Alternatively, the housing extends from the supply line and is integrated therewith.

The term supply line is used herein the specification and claims in its broad sense and denotes fluid supply lines (including liquid, gas and mixed media fluid lines), to of any size and purpose.

BRIEF DESCRIPTION OF THE DRAWINGS

In order to understand the invention and to see how it may be carried out in practice, an embodiment will now be described, by way of a non-limiting example only, with reference to the accompanying drawings, in which.

DETAILED DESCRIPTION OF EMBODIMENTS

Figure 1A:
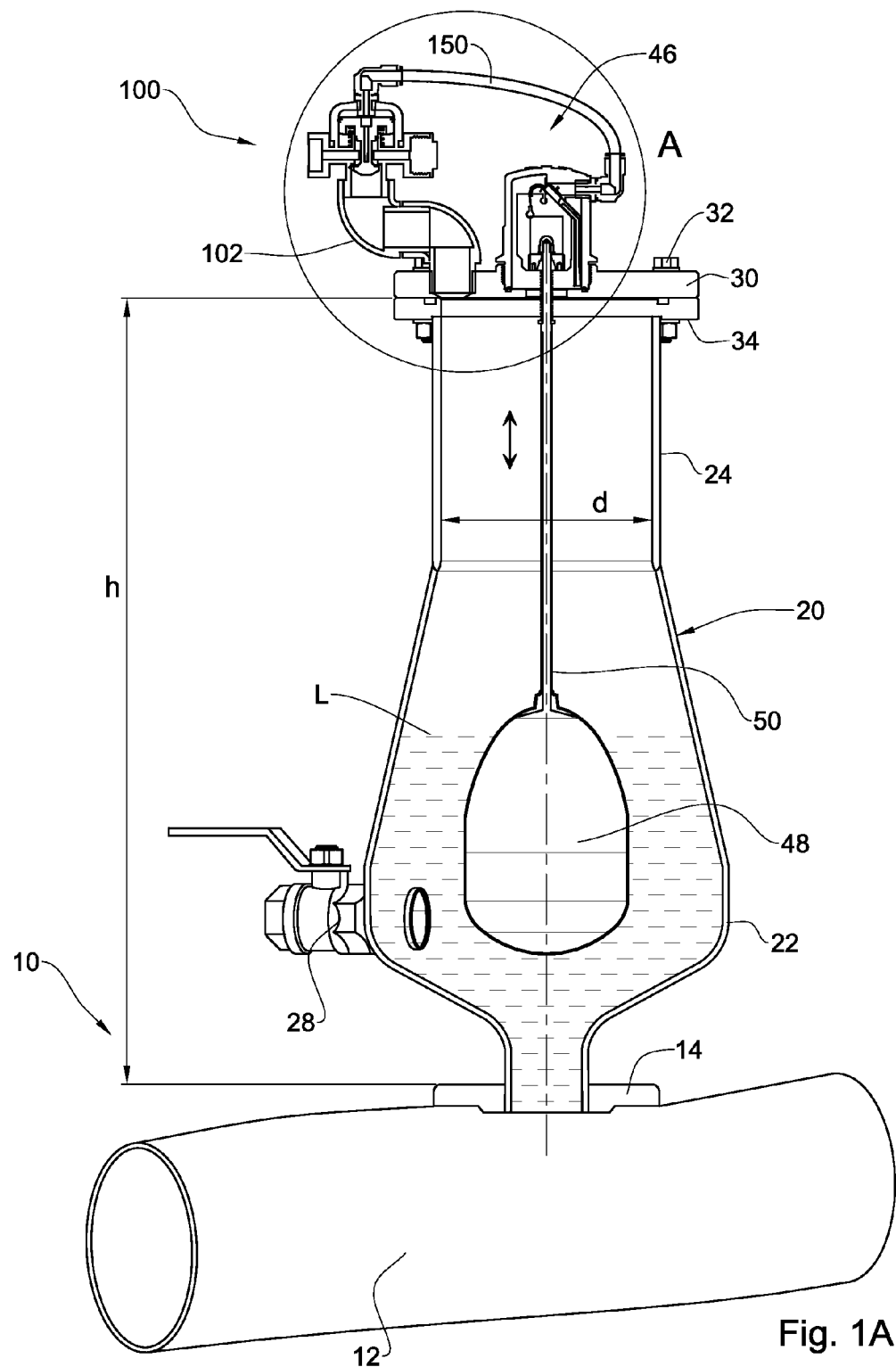
FIG. 1A illustrates a gas purge valve system according to the disclosed subject matter, at the closed position.
Figure 1B:
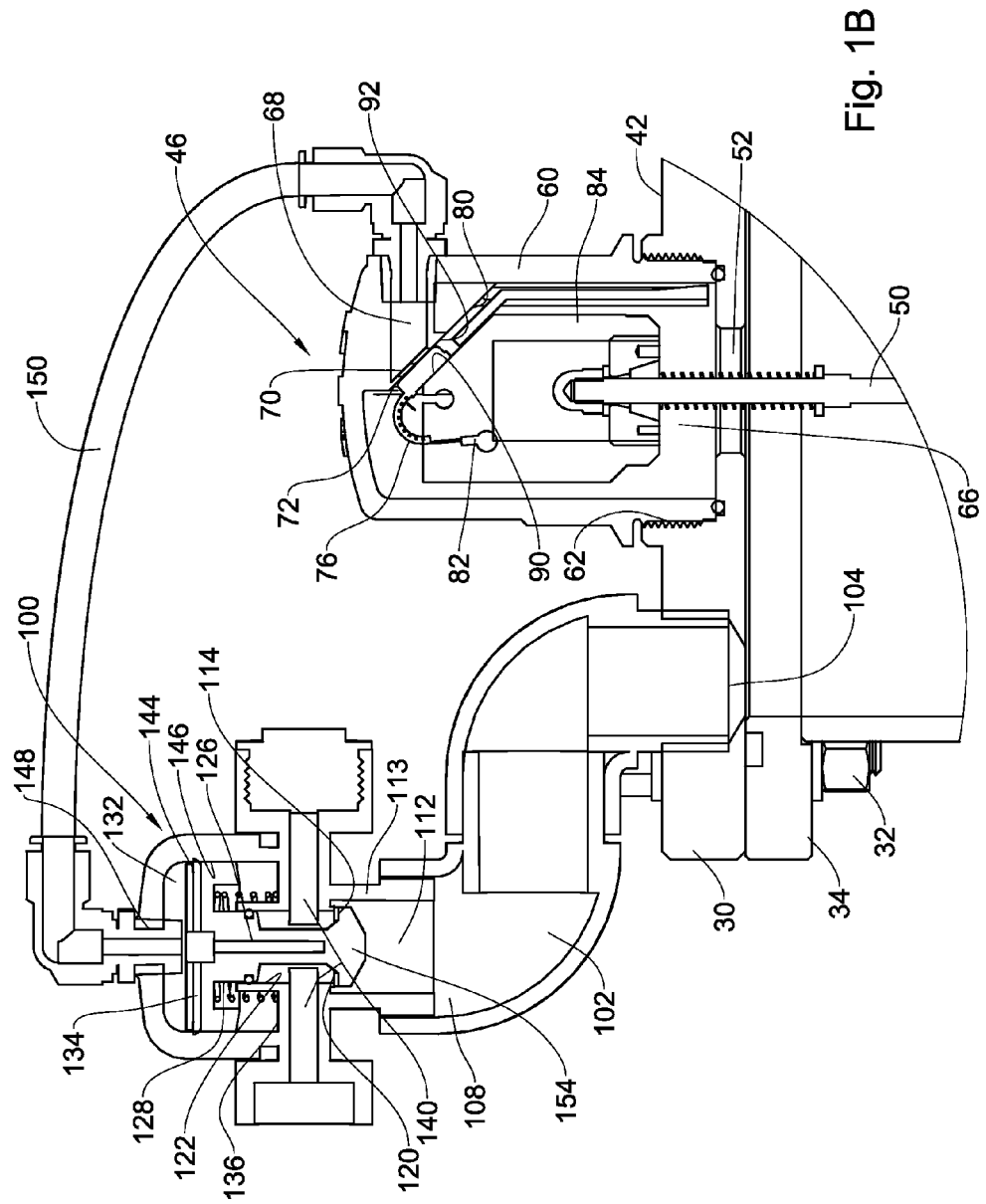
FIG. 1B is an enlargement of the portion marked 'A' in FIG. 1A.

Attention is first directed to FIGS. 1A and 1B of the drawings illustrating a gas purge system generally designated 10. The gas purge system is mounted over a main liquid supply line 12.

The gas purge system 10 comprises a cylindrical pear-shaped housing 20 configured with a lower portion 22 widened at its bottom, and a top tubular portion 24. The gas purge system is secured to the liquid supply line 12 via a coupling flange 14 such that the interior of the housing is in fluid flow with the interior of the fluid line 12. The housing is mounted such that its longitudinal axis extends substantially vertically. The lower portion 22 is fitted near a bottom end thereof with a ball-type faucet 28.

It is appreciated that the height of the housing 20 is a height h significantly longer then its diameter d, the ration being at least about, such that the housing serves as a chamber of considerable volume.

A mounting flange 30 is fixedly secured by a plurality of bolts 32 over a top flange 34 of the housing 20, however in a sealed fashion.

Attached over the mounting flange 30, at a top outside surface 42 there is an to automatic valve unit generally designated 46, having articulated thereto a float member 48 supported within the housing 20 and articulate to the automatic valve unit 46 via a rigid rod 50 extending through an opening 52 (FIGS. 1B and 2B) at the mounting flange 30, wherein said rigid rod 50 and the articulated float member 48 are restricted for substantially axial displacement coaxially with, or parallel to, the longitudinal axis of the housing 20. It is seen that the rod 50 is long and extends substantially low, thus enabling the float member 48 to displace, at its lowermost position, in close proximity towards the bottom of the housing 22, with a significant volume of gas trapped within the housing at the closed position, as will be discussed herein below.

As can best be seen in the enlarged figures of FIGS. 1A and 1B, the automatic valve unit 46 is configured with a housing 60 screw coupled at 62 to the mounting flange 30. The housing 60 defines a space 61 and is configured with an inlet port 66 being in flow communication with the housing 20, and with an outlet port 68 extending from a fluid through-flow aperture 70, with a valve seating 72 formed in the housing and bounding said aperture 70.

A flexible closure membrane 76 is secured at one end 80 to the housing 60 and at an opposite end 82 to a membrane displacing member 84 which in turn is articulated to the rigid rod 50. The membrane displacing member 84 is configured with an inclined membrane biasing wall surface 90, equally inclined as wall portion 92 configured with the opening 70.

The membrane displacing member 84 is adapted to be displaced only in the axial direction by the rigid rod 50 (responsive to liquid level within the housing 20) between two distinct positions, namely:

a sealed position (FIGS. 1A and 1B), wherein membrane displacing member 84 is axially upwards displaced whereby the inclined surface 90 bears against membrane 76 and biases it against the valve seating 72 so as to seal the aperture 70 and the outlet port 68;

and an open position (FIGS. 2A and 2B), wherein the membrane 76 is detached (pealed away) from the valve seating 72 so as to expose the aperture 70 and open the fluid flow path between the outlet port 68 and the space 66 of the housing 60, so that a flow path now extends between the housing 20, the space 66 and the outlet port 68.

The arrangement is such that the displacement of the membrane displacing to member 84 in a downwards sense progressively detaches successive transverse portions of the membrane 76 from the seating 72 so as to open the aperture 70, while displacement of the membrane displacing member 84 in an opposite sense (upwards) allows for the membrane 76 to become sealingly biased against the seating 72.

The mounting flange 30 further seats a normally closed gas discharge faucet generally designated 100, being in flow with an inside space of the housing 20 through a discharge conduit 102 having one end 104 open into the housing 20 and an opposite end 108 extending into an inlet port 112 of housing 113 of the gas discharge faucet 100. The inlet port 112 is configured with a valve seating 114 engageable by a sealing seat 120 of sealing plunger 126 extending through a plunger bore 122, said plunger being normally biased into sealing engagement with the sealing seating 114 by a coiled spring 128 extending within a control chamber 132 and bearing at one end against a shoulder portion of plunger head 134 of the sealing plunger 126 and at an opposite end against a housing wall portion 136. Extending from the plunger bore 122 there is a fluid discharge ports 140 (two, oppositely extending in the illustrated example), and being in fluid flow communication with the inlet port 112.

Figure 2A:
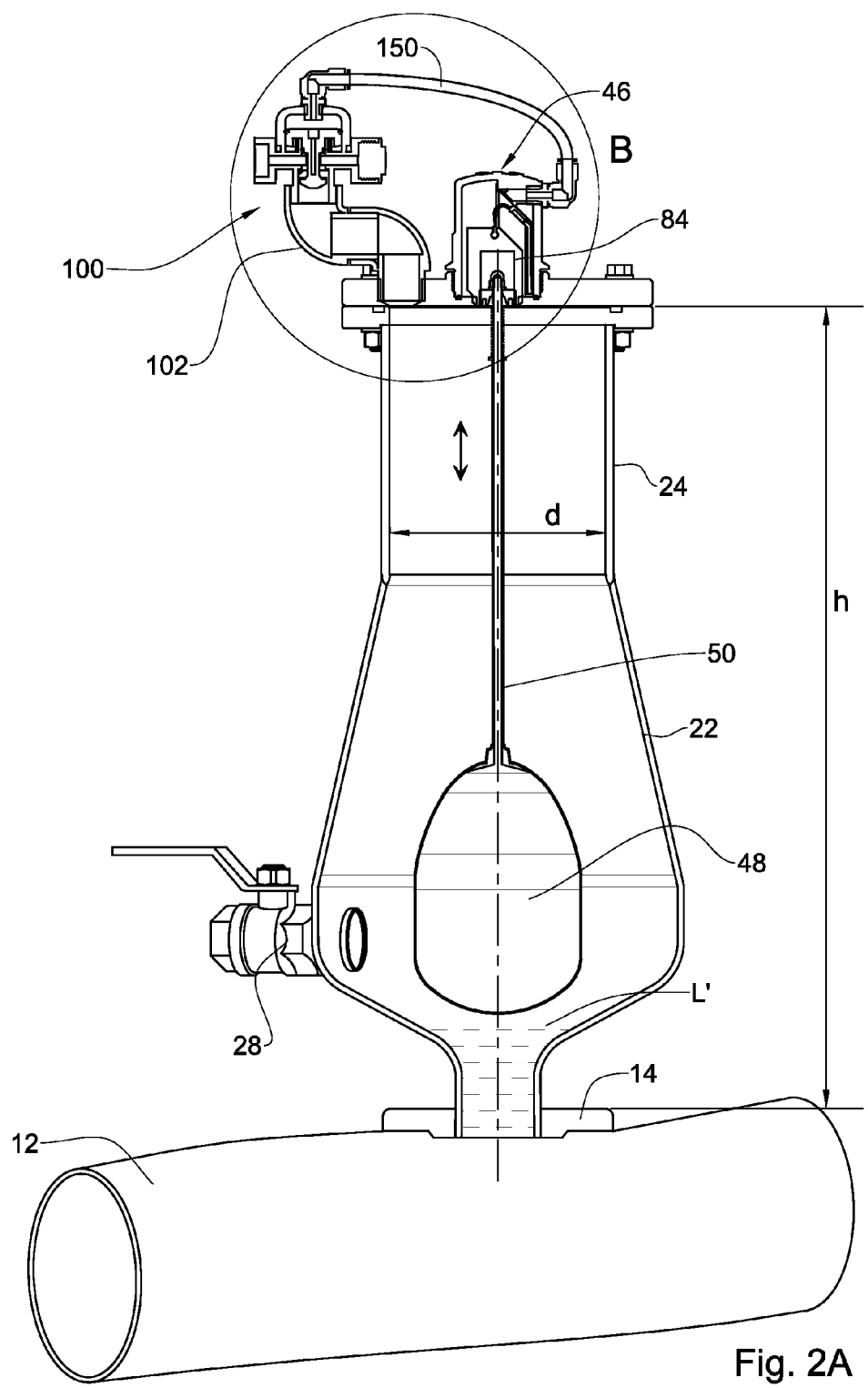
FIG. 2A illustrates the system of FIG. 1A at the open position.
Figure 2B:
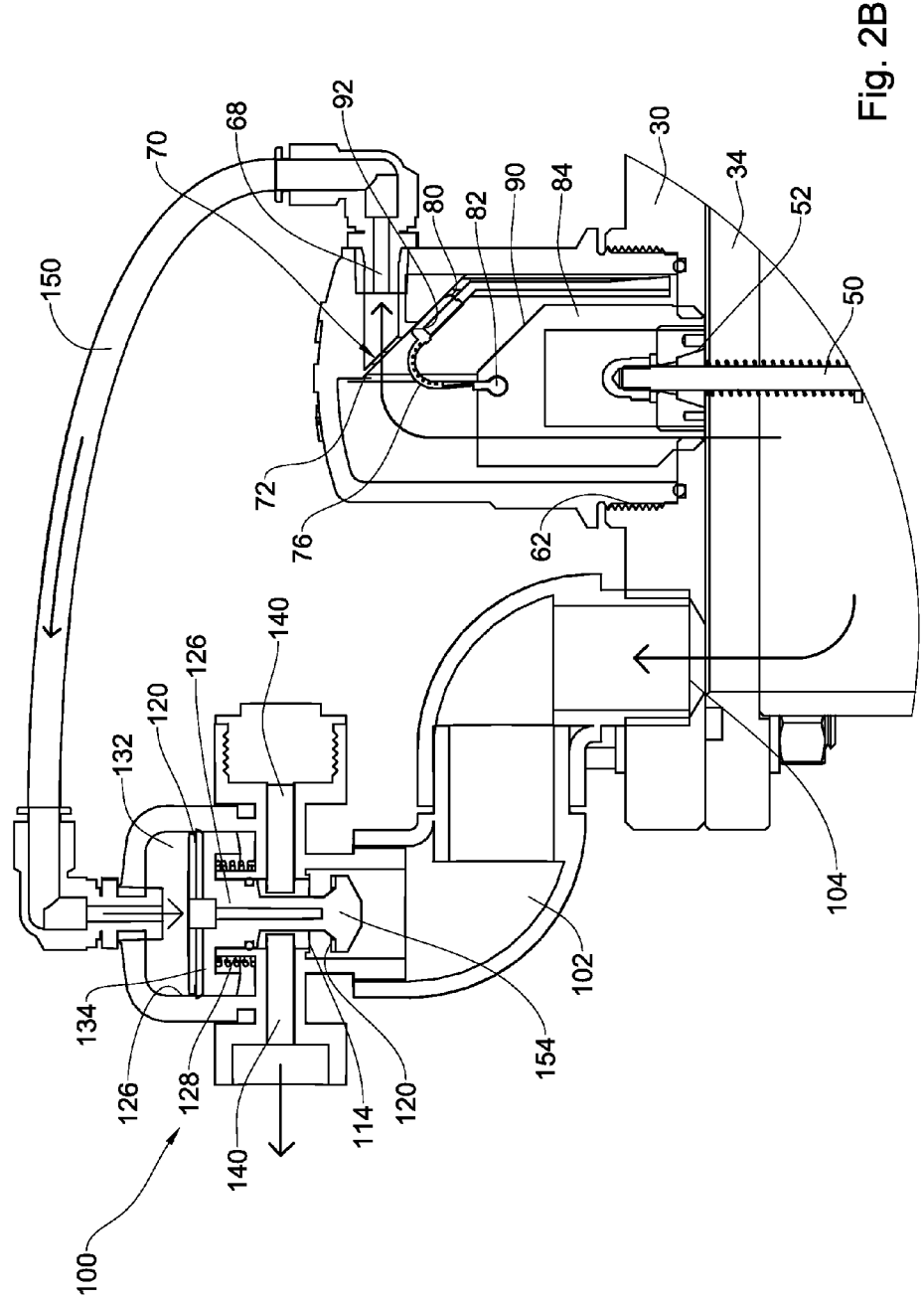
FIG. 2B is an enlargement of the portion marked 'B' in FIG. 2A.

As can be seen in FIGS. 1B and 2B the plunger head 134 is configured with an annular seal (O-ring) 144, whereby the sealing plunger 126 is sealingly displaceable in the axial direction within the housing 113, said sealing displacement of the seal 144 against the inner wall surface 146 renders the control chamber 132 being a sealed chamber, i.e. not being in fluid flow with the inlet port 112 or the fluid discharge ports 140.

Further noted, the plunger head 134 has a surface area greater than the sealing head portion 154, whereby the fluid pressure applied within the control chamber 132 is sufficient for displacing the sealing plunger 126 from its normally sealed position (FIGS. 1A and 1B) into the temporarily open position (FIGS. 2A and 2B) and where upon ceasing the pressure within the control chamber 132 the biasing spring will entail spontaneous displacement of the sealing plunger 126 back into its normally sealed position.

A fluid command port 148 is in fluid communication with the control chamber 132 and is in fluid flow communication with the outlet port 68 of the automatic valve unit 46 via a conduit 150.

As can be seen in FIGS. 1A and 2A, the float member 48 is a substantially large to float, to thereby provide an efficient closing force (buoyant force) in an upwards direction to close/seal the automatic valve unit 46, upon liquid level rise within the housing, and on the other hand to ensure a sufficiently strong opening force, (gravity force) in a downwards direction, upon liquid level drop within the housing, so as to open the automatic valve unit 46.

The arrangement is such that at the normal course of operation of the system, the system will be at the so called closed position (FIGS. 1A and 1B), wherein liquid level L within the housing 20 is at a normal level, sufficiently raised so as to generate buoyant forces on the float member 48, to thereby displace it into its uppermost position, entailing corresponding upwards displacement of the membrane displacing member 84 into the closed position, whereby the inclined surface 90 bears against membrane 76 and biases it against the valve seating 72 so as to seal the aperture 70 and the outlet port 68. At this position the gas discharge faucet 100 remains at its normally sealed position, such that fluid flow through the fluid discharge ports 140 is prohibited.

However, upon liquid level decrease within the housing 20, to a level L' (FIGS. 2A and 2B), the float member 48 follows the liquid level L' and descends under gravity, entailing corresponding axial displacement of the rigid rod and the articulated membrane displacing member 84 in a downwards sense, thereby progressively detaching successive transverse portions of the membrane 76 from the seating 72 so as to fully open the aperture 70.

Opening the aperture 70 facilitates a pressure command signal to flow via conduit 146 into the control chamber 132 of the gas discharge faucet 100, resulting in pressure built up within the control chamber 132 and further in displacement of the sealing plunger 126 from its normally sealed position (FIGS. 1A and 1B) into the open position (FIGS. 2A and 2B), whereby a substantially high flow rate path is now temporarily opened to facilitate discharge of high volume of gas through open end 104 of discharge conduit 102, then through valve seating 114 and out to the atmosphere (or a collecting duct; not shown) through the fluid discharge port/s 140.

Upon ceasing the pressure within the control chamber 132 the biasing spring will entail spontaneous displacement of the sealing plunger 126 back into its normally sealed position.

The arrangement disclosed hereinabove provides a compact discharge valve system, yet competent for efficiently discharging large volumes of gas from a liquid to system and at a high flow rate, whilst providing that the system remains normally closed unless at a discharge position.

Figure 3:
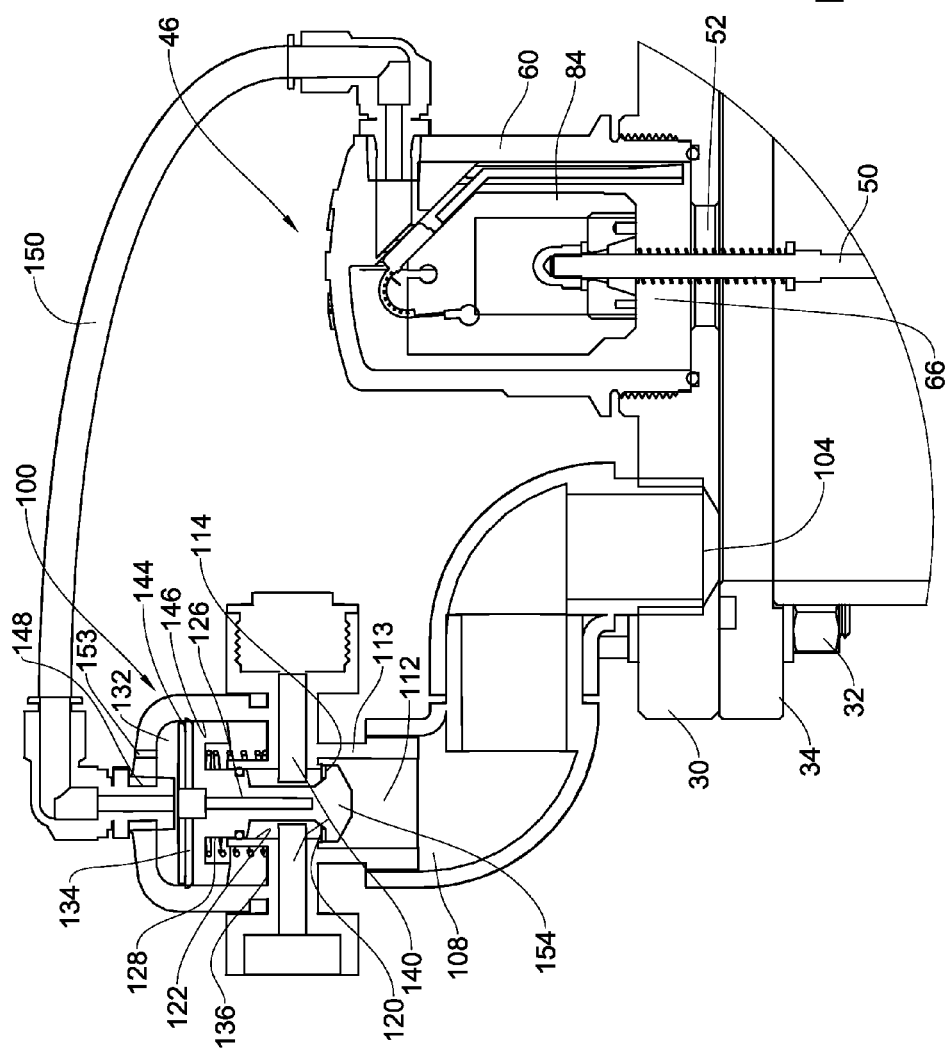
FIG. 3 is a view similar to FIG. 2A, illustrating a modification wherein a control chamber airing arrangement is configured.

In FIG. 3 of the drawings there is illustrated a modification of the arrangement disclosed in the previous figures, wherein like elements are designated with same reference numbers. In the example of FIG. 3 the control chamber 132 is configured for airing after displacement of the gas discharge faucet 100 into displace into its open position. Airing is facilitated via a bleed aperture 153 configured at the housing of the gas discharge faucet 100, wherein if desired a one way valve can be positioned, e.g. a mushroom type valve and the like.

It is however appreciated that the airing port can be configured at any location between the outlet port 68 of the automatic valve unit 46 and a control chamber 132 of the gas discharge faucet 100.

Figure 4A:
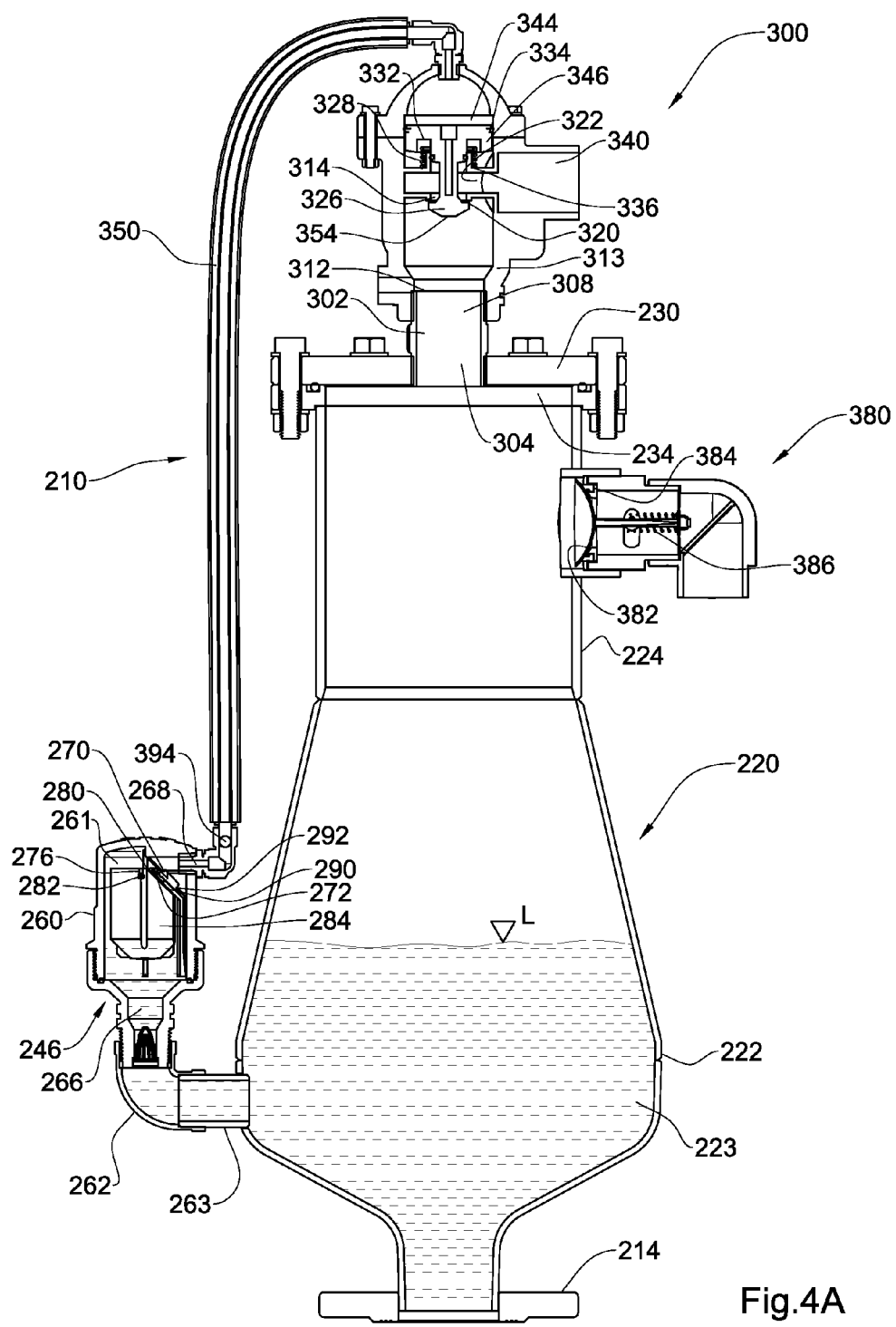
FIG. 4A illustrates a gas purge valve system according to a modification of the disclosed subject matter, at the closed position.
Figure 4B:
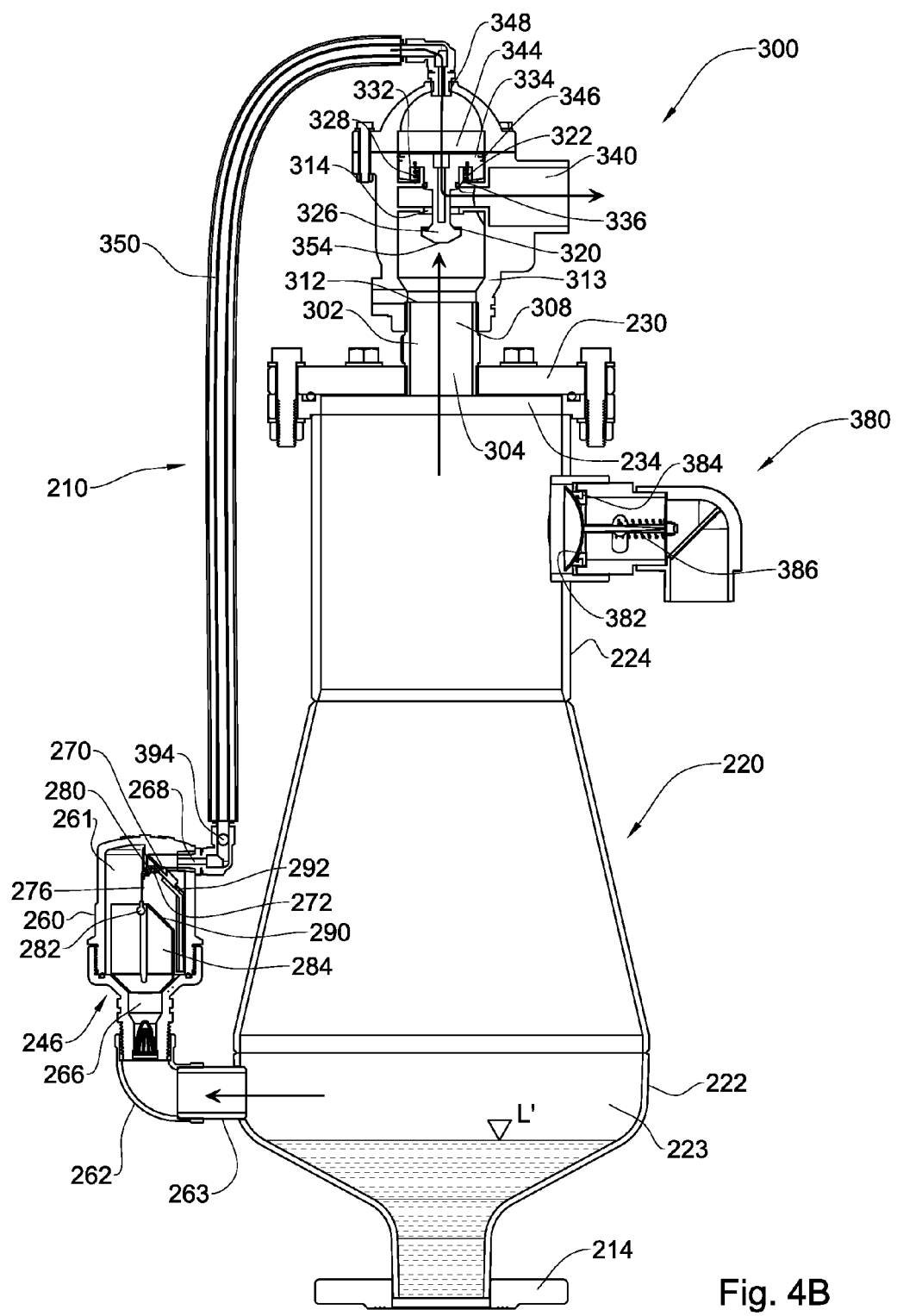
FIG. 4B illustrates the system of FIG. 4A at the open position.

Turning now to FIGS. 4A and 4B, there is illustrated a modified configuration of a gas purge valve system according to the presently disclosed subject matter. For sake of clarity, like elements are designated with like reference numbers as in the example of FIGS. 1 and 2, however shifted by 200.

The gas purge valve system generally designated 210 comprises a cylindrical pear-shaped housing 220 configured with a lower portion 222 widened at its bottom and configured for coupling to a top tubular portion 224. The gas purge system is configured for securing to a liquid supply line (not shown) via a coupling flange 214 such that the interior of the housing is in fluid flow with the interior of the fluid line.

A mounting flange 230 is fixedly secured over a top flange 234 of the housing 220, however in a sealed fashion.

Attached at the lower portion 222 of the housing 220, and being in flow communication with an inside space 223 thereof, there is mounted an automatic valve unit generally designated 246.

The automatic valve unit 246 is configured with a housing 260 screw coupled at 262 to a mounting extension 263 extending from the housing 222. The housing 260 defines a space 261 and is configured with an inlet port 266 being in flow communication with the inside space 223 within housing 220, and with an outlet port 268 extending from a fluid through-flow aperture 270, with a valve seating 272 formed in the housing and bounding said aperture 270, as best seen in the enlargements of FIGS. 1B and 2B. A flexible closure membrane 276 is secured at one end 280 to the housing 260 and at an opposite end 282 to a membrane displacing member 284, namely a float member, axially displaceable within the housing 260, responsive to liquid level therewithin, which in turn is responsive to liquid rise within the housing 220. The membrane displacing member 284 is configured with an inclined membrane biasing wall surface 290, equally inclined as wall portion 292 configured with the opening 270.

It is seen that the automatic valve unit 246 is connected to the housing 222 of the gas purge valve at a lower portion thereof, wherein manipulation between the closed position and the open position is responsive to liquid level within the housing 222 by communicating vessels rule. This configuration, when devoid of float member extending into the housing is typically suited for use with liquids substantially free of dirt and matter.

The membrane displacing member 284 is adapted to be displaced only in the axial direction (responsive to liquid level within the housing 20) between two distinct positions, namely:

a sealed position (FIG. 4A), wherein membrane displacing member 284 is axially upwards displaced whereby the inclined surface 290 bears against membrane 276 and biases it against the valve seating 272 so as to seal the aperture 270 and the outlet port 268;

and an open position (FIG. 4B), wherein the membrane 276 is detached (peeled away) from the valve seating 272 so as to expose the aperture 270 and open the fluid flow path between the outlet port 268 and the space 266 of the housing 260, so that a flow path now extends between the housing 220, the space 266 and the outlet port 268.

The arrangement is such that the displacement of the membrane displacing member 284 in a downwards sense progressively detaches successive transverse portions of the membrane 276 from the seating 272 so as to open the aperture 270, while displacement of the membrane displacing member 284 in an opposite sense (upwards) allows for the membrane 276 to become sealingly biased against the seating 272.

The mounting flange 330 further seats a normally closed gas discharge faucet generally designated 300 of similar design to discharge faucet generally designated 100 in the previous example, and reference is made thereto for further details. The discharge to faucet 300 is in flow with the inner space 223 of housing 220 through a discharge conduit 302 having one end 304 open into the housing 220 and an opposite end 308 extending into an inlet port 312 of housing 313 of the gas discharge faucet 300. A valve seating 314 is engageable by a sealing seat 320 of a sealing plunger 326 extending through a plunger bore 322, said plunger being normally biased into sealing engagement with the sealing seating 314 by a coiled spring 328 extending within a control chamber 332, and bearing at one end against a shoulder portion of plunger head 334 of the sealing plunger 326 and at an opposite end against a housing wall portion 336. Extending from the plunger bore 322 there is a fluid discharge ports 340 (one only, as opposed to two in the previous example), and being in fluid flow communication with the inlet port 312.

The plunger head 334 is configured with an annular seal (O-ring) 344, whereby the sealing plunger 326 is sealingly displaceable in the axial direction within the housing 313, said sealing displacement of the seal 344 against the inner wall surface 346 renders the control chamber 332 being a sealed chamber, i.e. not being in fluid flow with the inlet port 312 or the fluid discharge port 340.

Further noted, the plunger head 334 has a surface area greater than the sealing head portion 354, whereby the fluid pressure applied within the control chamber 332 is sufficient for displacing the sealing plunger 326 from its normally closed/sealed position (FIG. 4A) into the temporarily open position (FIG. 4B) and where upon ceasing the pressure within the control chamber 332 the biasing spring will entail spontaneous displacement of the sealing plunger 326 back into its normally sealed position.

A fluid command port 348 is in fluid communication with the control chamber 332 and is in fluid flow communication with the outlet port 268 of the automatic valve unit 246 via a conduit 350, which in the present example is configured as a double shield wall, for reinforcing same.

The arrangement is such that at the normal course of operation of the system, the system will be at the so called closed position (FIG. 4A), wherein liquid level L within the housing 220 is above that of the float member 284 of the automatic valve unit 246 sufficiently so as to generate buoyant forces on the float member 248 owing to the communicating vessels rule, to thereby displace the float member 248 into its uppermost, closed position, entailing corresponding upwards displacement of the membrane displacing member 284 into the closed/sealed position, whereby the inclined to surface 290 bears against membrane 276 and biases it against the valve seating 272 so as to seal the aperture 270 and the outlet port 268. At this position the gas discharge faucet 300 remains at its normally sealed position, such that fluid flow through the fluid discharge ports 340 is prohibited.

However, upon liquid level decrease within the housing 220, to a level L' (FIG. 4B), the membrane displacing member 284 follows the liquid level L' and descends under gravity, entailing progressively detaching successive transverse portions of the membrane 276 from the seating 272 so as to fully open the aperture 270.

Opening the aperture 270 facilitates a pressure command signal to flow via conduit 346 into the control chamber 332 of the gas discharge faucet 300, resulting in pressure built up within the control chamber 332 and further in displacement of the sealing plunger 326 from its normally sealed position (FIG. 4A) into the open position (FIG. 4B), whereby a substantially high flow rate path is now temporarily opened to facilitate discharge of high volume of gas through open end 304 of discharge conduit 302, then through valve seating 314 and out to the atmosphere (or a collecting duct; not shown) through the fluid discharge port 340, as represented by the arrows.

Upon ceasing the pressure within the control chamber 332 the biasing spring will entail spontaneous displacement of the sealing plunger 326 back into its normally sealed position.

It is appreciated that the configuration disclosed in connection with FIGS. 4A and 4B, namely exposure of the automatic valve unit 246 to liquid within the housing 222 renders it not being suitable for liquids containing material, e.g. sewage, industrial waste and the like, but is rather suitable for clean liquids.

As can further be noted in FIG. 4A and 4B, the housing 222 is configured at an upper portion thereof with a so-called vacuum breaker generally designated 380, configured for facilitating automatic ingress of gas (e.g. ambient air) into the housing at the event of pressure decrease therein.

Typically said vacuum breaker 380 is configured as a one-way type valve fitted at an upper portion of the housing. The arrangement is such that a seal member 382 is normally biased into sealing engagement of an inlet seat 384 by means of a compression spring 386. However, upon pressure drop within the housing 222 the spring 386 compress, allowing the seal member 382 to displace from the seat 384, thereby to facilitating air ingress into the housing 222.

Furthermore, the control chamber is configured for airing after displacement of the gas discharge faucet into displace into its open position. Airing can be facilitated via a bleed aperture 394 or a bleed valve (not shown). The bleed aperture 394 can configured at any location between an outlet port of the automatic valve unit and a control chamber of the gas discharge faucet.

While there has been shown an example of the disclosed subject matter, it is to be understood that many changes may be made therein without departing from the spirit of the invention, mutandis mutatis.

The invention claimed is:

1. An automatic gas purge valve comprising a housing configured with an automatic gas purge valve system comprising
   a normally closed gas discharge faucet having a control chamber, the gas discharge faucet being configured with a fluid inlet port being in flow communication with the housing and a fluid discharge port configured for discharging gas at substantially high flow rates; and
   an automatic valve unit having an inlet port in flow communication with the housing and an outlet port being in flow communication with the control chamber, and configured for selectively generating a flow pulse at the control chamber to displace the gas discharge faucet into its open position;
   wherein the automatic valve unit is manipulable between a closed position and an open position solely responsive to liquid level within the housing;
   wherein the automatic valve unit is configured with a flexible closure membrane secured at one end to the housing and at an opposite end to a membrane displacing member; and
   wherein displacement of the membrane displacing member in a downwards sense progressively detaches successive transverse portions of the flexible closure membrane so as to open the outlet port towards the open position of the automatic valve.

2. The automatic gas purge valve according to claim 1, wherein the automatic valve unit is connected to the housing at a lower portion thereof, wherein manipulation between the closed position and the open position is responsive to liquid level within the housing by communicating vessels rule.

3. The automatic gas purge valve according to claim 1, wherein liquid rise within the housing displaces the automatic valve unit into the closed position and liquid decrease results in opening the automatic valve unit and consequently generating a pressure signal at the control chamber so as to displace the automatic valve unit into its open position to purge the automatic gas purge valve.

4. The automatic gas purge valve according to claim 1, wherein the housing is configured for mounting at a substantially vertical position on a fluid flow line.

5. The automatic gas purge valve according to claim 1, wherein the housing has a height extending at least 4 times a diameter thereof.

6. The automatic gas purge valve according to claim 1, wherein the control chamber is configured for airing after displacement of the gas discharge faucet into displace into its open position.

7. The automatic gas purge valve according to claim 1, wherein the housing is configured as a cylindrical chamber for mounting on a main fluid supply line.

8. The automatic gas purge valve according to claim 1, wherein the housing of the gas purge valve is configured with a vacuum breaker, for facilitating automatic ingress of gas into the housing at the event of pressure decrease therein.

9. The automatic gas purge valve according to claim 1, further comprising a float member extending into the housing and articulated to the automatic valve unit.

10. The automatic gas purge valve according to claim 9, wherein the housing is configured at an upper end thereof with a mounting flange accommodating the gas discharge faucet and the automatic valve unit.

11. The automatic gas purge valve according to claim 9, wherein the float member is articulated to the automatic valve unit via a rigid link extending downwards from the automatic valve unit into an inside space of the housing downwards from the automatic valve unit.

12. The automatic gas purge valve according to claim 9, wherein the automatic valve unit is a peal-away type valve.

\* \* \* \* \*